United States Patent [19]
Krumbein

[11] 3,833,161
[45] Sept. 3, 1974

[54] APPARATUS FOR INTERCEPTING AND THREADING THE LEADER OF CONVOLUTED MOTION PICTURE FILM OR THE LIKE

[75] Inventor: Fritz Krumbein, Stuttgart-Mohringen, Germany

[73] Assignee: Robert Bosch Photokino GmbH, Stuttgart, Germany

[22] Filed: Feb. 7, 1973

[21] Appl. No.: 330,385

[30] Foreign Application Priority Data
Feb. 8, 1972 Germany............................ 2205719
Feb. 24, 1972 Germany............................ 2208733

[52] U.S. Cl. ................................................ 226/92
[51] Int. Cl. ............................................ G03b 1/56
[58] Field of Search ........ 226/91, 92; 242/192, 195; 352/157, 158

[56] References Cited
UNITED STATES PATENTS

| | | | |
|---|---|---|---|
| 3,604,657 | 9/1971 | Igarashi.............................. | 242/195 |
| 3,706,423 | 12/1971 | Neff................................... | 352/158 |
| 3,724,776 | 4/1973 | McKee................................. | 226/92 |
| 3,724,777 | 4/1973 | Martin................................. | 242/195 |

*Primary Examiner*—Allen N. Knowles
*Attorney, Agent, or Firm*—Michael S. Striker

[57] ABSTRACT

Apparatus for intercepting and threading the leader of convoluted motion picture film has a catcher with a tooth which can enter an aperture of the leader and thereupon moves toward two advancing wheels which serve to transport the leader toward a takeup reel. The catcher is provided with guide means in the form of a notch or recess and/or one or more platforms which straighten out a curved or knicked leader so that the tip of the leader is more likely to find its way into the nip of the advancing wheels. The recess or notch is provided in that edge face of the tooth on the catcher which faces the advancing wheels. The platforms flank the tooth and not only serve to guide the leader but also center the catcher when they engage the flanges of one of the advancing wheels.

9 Claims, 10 Drawing Figures

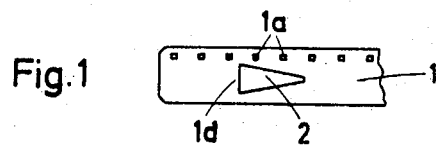
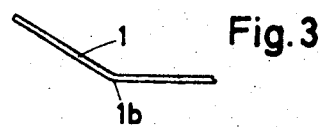
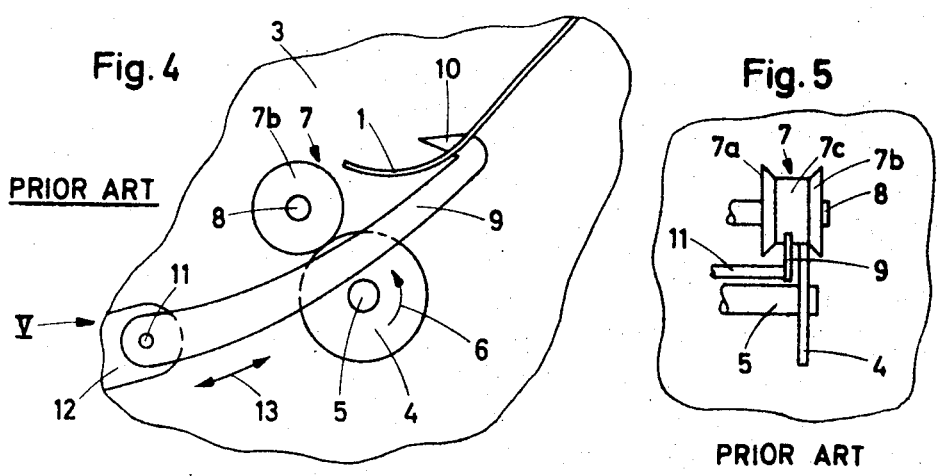
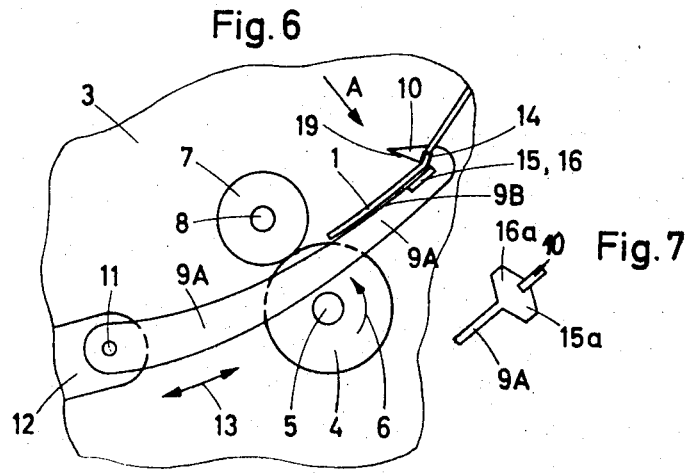

APPARATUS FOR INTERCEPTING AND THREADING THE LEADER OF CONVOLUTED MOTION PICTURE FILM OR THE LIKE

BACKGROUND OF THE INVENTION

The present invention relates to apparatus for intercepting and threading the leader of convoluted motion picture film or the like. Such apparatus are employed in motion picture cameras or projectors with or without sound recordal and sound reproduction, but their use is not limited to cinematographic apparatus.

It was already proposed to replace the conventional deflector of presently known apparatus for intercepting the leader of convoluted film with a so-called catcher having a projection or tooth capable of entering an aperture in the leader and of advancing the leader into the range of advancing means for transport along a predetermined path toward the core of a takeup reel. Reference may be had to my copending application Ser. No. 300,416 filed Oct. 17, 1972 for "Method and apparatus for intercepting and advancing the leader of convoluted strip material." A drawback of presently known apparatus which employ catchers is that the catchers are not sufficiently reliable, especially if the leader of convoluted material is deformed, for example, by being curved or knicked or folded so that its tip does not invariably enter the desired path for travel toward the take-up reel. On the other hand, an intercepting apparatus which employs a catcher exhibits a number of important advantages, especially as concerns its compactness and its ability to find and advance the leader of convoluted material (such as motion picture film) which is not stored in a cassette or an analogous container.

The advancing means for the leader of strip-shaped material in an intercepting apparatus which employs a mobile catcher normally comprises two wheels defining a passage which the leader must enter in order to be advanced toward the takeup reel. If the leader is deformed in the aforedescribed manner, for example, if the leader is curved so that its tip extends away from the catcher, the movement of the catcher in a direction from the outermost convolution of a supply of convoluted material toward the advancing wheels does not necessarily result in introduction of the tip of the leader into the passage between the advancing wheels. On the contrary, when the tip of a strongly deformed leader strikes against one of the wheels, it undergoes further deflection in response to continued movement of the catcher toward the advancing wheels so that the entire intercepting and threading procedure must be repeated by disengaging the catcher from the leader and by rotating the supply of convoluted material in a direction to collect the strip. It can also happen that, even if the tip of a deformed leader enters the nip of the advancing wheels, it is likely to bypass one of the wheels (normally a driven friction wheel) so that it is not positively engaged and does not travel toward the takeup reel upon completed detachment from the projection of the catcher.

SUMMARY OF THE INVENTION

An object of the invention is to provide an apparatus for intercepting and threading the leader of convoluted motion picture film or other convoluted strip-shaped material with a novel and improved catcher which is more likely to insure the entry of the leader into a predetermined path than presently known catchers even if the leader is strongly deformed to assume an arcuate, knicked, folded or other shape.

Another object of the invention is to provide an apparatus of the just outlined character with a catcher which can automatically reduce the extent of deformation of an intercepted leader to a degree which is acceptable to insure that the leader will automatically advance along a desired path as soon as it is detached from the catcher.

A further object of the invention is to provide a catcher which is more versatile than the catchers of presently known intercepting and threading apparatus even though its manufacturing cost and space requirements are as small as those of conventional catchers.

An additional object of the invention is to provide an apparatus for intercepting and threading the leader of convoluted motion picture film which insures satisfactory interception and guidance of the leader irrespective of the diameter of convoluted strip-shaped material and in spite of the fact that the apparatus need not be provided with any guide means (other than the catcher itself) in the space between the support for a supply of convoluted material and the advancing means for the leader.

The invention is embodied in an apparatus for intercepting and threading apertured leaders of strip-shaped materials, such as lengths of motion picture film. The apparatus can form part of a motion picture camera or projector and comprises a support (e.g., a spindle) for a supply of convoluted strip-shaped material whose leader constitutes the free end of the outermost convolution and is provided with an aperture of perforation, e.g., an aperture of triangular shape whose width decreases in a direction away from the tip of the leader, advancing means (e.g., a driven friction wheel and a flanged idler wheel) spaced apart from the support and defining a passage for the leader of the supply on the support, a catcher which is movable along a predetermined path extending between the supply of convoluted material on the support and the advancing means and having a projection or tooth which is arranged to enter the aperture of the leader of the supply on the support, and means for moving the catcher along its path. In accordance with a feature of the invention, the catcher is further provided with guide means in the form of a recess, notch and/or one or more pairs of guide surfaces provided in the region of the projection to orient the leader whose aperture receives the projection so that the leader invariably enters the passage on movement of the catcher toward the advancing means. By suitable selection of the position and/or depth of the recess or notch and/or by suitable selection of the positions and/or inclination of guide surfaces on the catcher, the latter can introduce the leader into the passage which is defined by the advancing means even if the leader exhibits a pronounced kink or fold or tends to curl its tip away from the catcher.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a plan view of a deformed leader of a strip or web of motion picture film which is to be intercepted and threaded in the apparatus of the present invention;

FIG. 2 is a side elevational view of the leader shown in FIG. 1;

FIG. 3 is a side elevational view of a differently deformed leader:

FIG. 4 is a fragmentary side elevational view of a conventional apparatus for intercepting the leader:

FIG. 5 is a view as seen in the direction of arrow V in FIG. 4:

FIG. 6 is a fragmentary side elevational view of an apparatus whose catcher is constructed in accordance with a first embodiment of the invention;

FIG. 7 is a fragmentary plan view of the catcher as seen in the direction of arrow A shown in FIG. 6;

DESCRIPTION OF THE PREFERRED EMBODIMENTS

Figure 8:
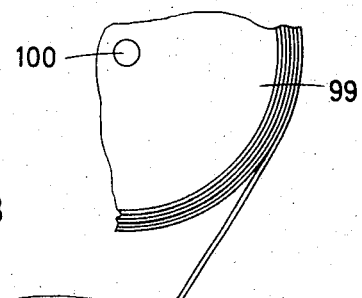
FIG. 8 is a fragmentary side elevational view of an apparatus comprising a catcher which embodies another form of the invention.

FIG. 1 is a plan view of the leader 1 of a supply of convoluted motion picture film (such as the supply 99 shown in FIG. 8). The film is provided with a row of customary perforations 1a for a claw pull-down or sprocket (not shown) serving to transport the film in a motion picture camera or projector. Furthermore, the leader 1 has a wedge-shaped opening or aperture 2 whose width decreases in a direction away from the tip of the leader and serves to receive the projection or tooth 10 of a catcher or catcher arm, such as the conventional catcher arm 9 shown in FIGS. 4 and 5. Problems arise when the leader 1 is bent or curved in a manner as shown in FIGS. 2 and 4 or when the leader exhibits a pronounced knick or fold 1b as shown in FIG. 3. It has been found that such leader cannot be readily introduced into the passage between two rotary advancing members of the film threading mechanism because the tip of the leader is likely to bypass the nearest advancing member so that the leader cannot be properly engaged and transported into the range of the pull-down or sprocket and toward the core of the takeup reel.

FIGS. 4 and 5 illustrate a portion of a motion picture projector which comprises a conventional apparatus for intercepting and threading the leader 1 so that the leader can move into the range of the pull-down or sprocket and on toward the core of the takeup reel. The advancing means of the apparatus comprises a relatively narrow friction wheel 6 and a relatively wide idler wheel or counter wheel 7 which defines with the friction wheel a passage for the leader 1. In other words, if the leader 1 which has been intercepted by the catcher 9 is to enter a predetermined path for travel toward the core of the takeup reel, it must be introduced between the friction wheel 4 and flanged idler wheel 7 to be thereupon positively guided toward the pull-down or sprocket, not shown. The wheels 4 and 7 are mounted in the housing 3 of the motion picture projector and the shaft 5 for the wheel 4 is positively driven during threading of the leader. The wheel 7 is freely rotatable on or with its shaft 8. The direction in which the shaft 5 rotates the friction wheel 4 during threading of the leader 1 is indicated by an arrow 6. The plane of the friction wheel 4 is located between the flanges 7a, 7b of the idler wheel 7 and is adjacent to one of these flanges so as to provide room for movements of the catcher 9 which is articulately connected with a holder or carrier 12 by means of a pivot member 11 and can be moved along a predetermined path extending between a supply of convoluted film and the wheels 4, 7. The distance which the catcher 9 covers depends on the diameter of the supply of convoluted film.

The right-hand end portion of the catcher 9 (as viewed in FIG. 4) is provided with a wedge-like projection or tooth 10 which can enter the aperture 2 of a leader 1 to thereupon entrain the leader toward the passage between the wheels 4 and 7 of the advancing means. The direction in which the catcher 9 is movable are indicated by a double-headed arrow 13. When properly positioned, the catcher 9 (whose width is but a fraction of the width of the leader 1) is located substantially midway between the flanges 7a, 7b of the idler wheel 7 and can readily bypass the friction wheel 4 during movement in directions indicated by the arrow 13. The means for moving the holder 12 for the catcher 9 is not shown in the drawing, such means can be constructed, assembled and operated in a manner as disclosed in the aforementioned copending application Ser. No. 300,416 filed Oct. 17, 1972.

FIG. 4 shows that the projection 10 of the catcher 9 in a conventional apparatus extends into the aperture 2 of a leader 1 which is curved in a manner as shown in FIG. 2. It will be noted that, when the projection 10 moves toward the passage between the wheels 4 and 7, the tip of the leader 1 is likely to bypass the passage by moving along the upper side of the core 7c between the flanges 7a and 7b of the idler wheel 7. In other words, the core 7c will actually tend to deflect the leader 1 so that the latter cannot enter the predetermined path for transport toward the takeup reed.

However, even if the leader 1 is not deformed in a manner as shown in FIGS. 2 to 4, it is still not always properly threaded into the apparatus for reasons which will be appreciated by considering FIG. 5 which shows that the width of the catcher 9 is only a small fraction of the distance between the flanges 7a and 7b. Thus, and assuming that the catcher 9 is not accurately centered between the flanges 7a and 7b (for example, due to deformation or wobbling of the pivot member 11), it can cause the leader 1 to bypass the narrow friction wheel 4 so that the leader is not positively advanced in a direction toward the takeup reel. Thus, satisfactory threading with the apparatus of FIGS. 4 and 5 is assured only if the catcher 9 is mounted with a high degree of accuracy, if the leader 1 is not overly deformed, and/or if the aperture 2 is located exactly midway between the two marginal portions of the leader.

FIGS. 6 and 7 illustrate a portion of an apparatus which embodies one form of the improved catcher. The catcher is denoted by the reference character 9A and all other parts of the apparatus are denoted by characters corresponding to those employed in FIGS. 4 and 5.

In accordance with a feature of the invention, the catcher 9A is provided with guide means which includes a relatively deep recess 14 in that edge face (19) of the projection 10 which faces the advancing means including the wheels 4 and 7. As shown in FIG. 6, the inclination of the recess 14 is such that a leader 1 whose aperture 2 receives the projection 10 (namely so that the projection 10 of the catcher 9A engages that portion of the leader which is indicated by the reference character 1d shown in FIG. 1) will tend to lie against the edge face 9B of the catcher even if the leader normally tends to curl or knick in a manner shown in FIGS. 2 or 3. Consequently, the foremost portion of the leader 1 will invariably enter the passage between the wheels 4 and 7 when the catcher 9A is caused to move in a direction to the left, as viewed in FIG. 6. The width of the recess 14 need not appreciably exceed the thickness of the leader 1.

The guide means on the improved catcher 9A further comprises two platforms or wings 15, 16 which are disposed at the opposite sides of the projection 10 and have guide surfaces 15a, 16a against which the adjacent portion of the leader 1 abuts when the projection 10 extends into the aperture 2 in a manner as shown in FIG. 6. The platforms 15, 16 are provided on the catcher 9A between the edge face 19 and the wheels 4, 7 of the advancing means. The combined width of the platforms 15, 16 is preferably only slightly less than the distance between the flanges 7a and 7b of the idler wheel 7 so that the platforms center the catcher 9A when they reach and engage the respective flanges to thus insure that the leader will enter the passage between the wheels 4, 7 and that a portion of such leader will enter the nip between the wheel 4 and the core 7c of the idler wheel 7 whereby the driven friction wheel 4 automatically feeds the leader along a predetermined path leading to the core of the takeup reel.

When the projection 10 finds and enters the aperture 2 of the leader 1 of a supply of convoluted film (see the supply 99 in FIG. 8), and the catcher 9A starts to move away from such supply so that the projection 10 travels toward the wheels 4, 7, the portion 1d of the leader 1 enters the recess 14 in the edge face 19 and the leader is automatically caused to abut against the guide surfaces 15a, 16a of the platforms 15, 16 to thus insure that its tip enters the passage between the wheels 4, 7 on further movement of the catcher 9A toward the advancing means. As mentioned above, the recess 14 insures that, even though a leader 1 is deformed in a manner as shown in FIGS. 2 and 3, it still tends to abut against the edge face 9B when its portion 1d extends into the recess 14. A comparison of FIGS. 4 and 6 will indicate that the leader 1 which is engaged by the improved catcher 9A is much more likely to find its way into the passage between the wheels 4 and 7 so as to be guided toward the takeup reel.

Figure 9:
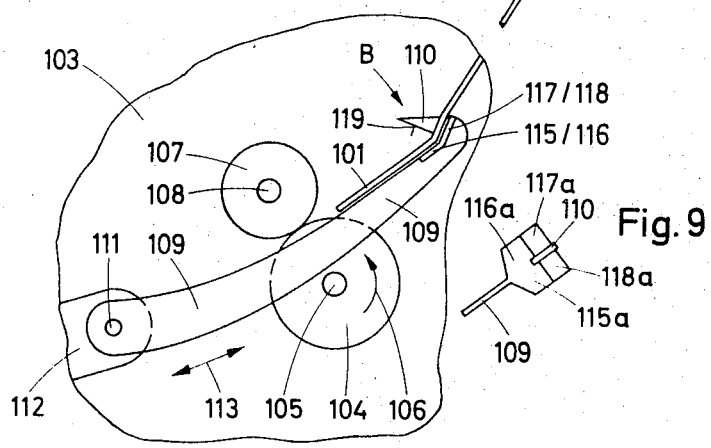
FIG. 9 is a fragmentary end elevational view of the catcher as seen in the direction of arrow B shown in FIG. 8.
Figure 10:
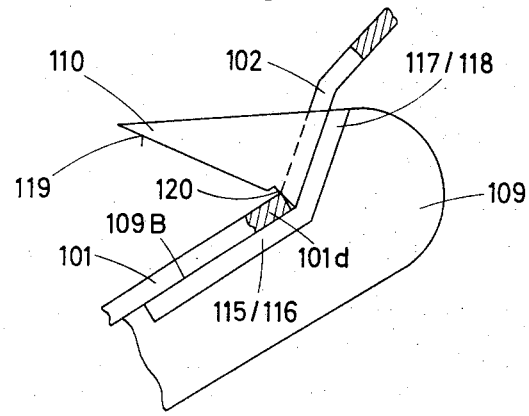
FIG. 10 is a greatly enlarged side elevational view of a portion of the catcher shown in FIGS. 8 and 9, with the leader of the film illustrated in longitudinal section.

FIGS. 8, 9 and 10 illustrate an apparatus employing a catcher 109 which constitutes a modification of the catcher 9A. The catcher 109 also comprises a projection 110 with an edge face 119 which faces the advancing means including the wheels 104, 107, and the catcher 109 is provided with somewhat modified guide means including a relatively shallow notch 120 (see FIG. 10) in the innermost portion of the edge face 119 as well as two composite platforms which include portions 116, 117 located at one side and portions 115, 118 located at the other side of the projection 110. The platform 116, 117 has a guide surface including the portions 116a, 117a which make an obtuse angle, and the platform 115, 118 has a guide surface including the portions 115a, 118a which also make an obtuse angle. The surface portions 115a, 116a are located between the edge face 119 and the advancing means, and the edge face 119 is located between the advancing means and the surface portions 117a, 118a, i.e., the edge face 119 is located ahead of the surface portions 117a, 118a and behind the surface portions 115a, 116a, as considered in the direction of movement of the projection 110 toward the wheels 104 and 107. All other parts of the apparatus shown in FIGS. 8 to 10 are denoted by reference characteristics similar to those used in FIGS. 4 to 6 plus 100. Thus, the housing of the motion picture projector is shown at 103, the shaft for the flanged idler wheel 107 at 108, and the means for moving the catcher 109 (in directions indicated by a double-headed arrow 113) includes a carrier or holder 112. The drive means for moving the carrier or holder 112 forms no part of the present invention.

When the projection 110 finds and enters the aperture 102 of the leader 101 and the catcher 109 begins to move in a direction to advance the projection 110 toward the wheels 104, 107, the leader 101 slides along the edge face 119 and a portion (101d) thereof enters the notch 120. At the same time, the underside of the leader 101 abuts against the surface portions 115a–118a of the respective platforms 115, 118 and 116, 117 so that the tip of the leader 101 is much less likely to be spaced apart from the edge face 109B of the catcher 109 and is more likely to enter the passage between the wheels 104, 107. The notch 120 can be omitted because the platforms shown in FIGS. 8–10 are capable of properly orienting the leader 101 without necessitating a more or less positive engagement between the projection 110 and the portion 101d of the leader.

The omission of a relatively deep recess (such as the recess 14 of FIG. 6) is desirable in certain instances in order to avoid excessive weakening of the catcher in the region of the projection. Furthermore, instead of weakening the catcher, the guide means including the platforms 115, 118 and 116, 117 of FIGS. 8–10 actually strengthens or reinforces the weakest or most delicate portion of the catcher 109, namely, that portion which is integral with the projection 110. Still further, the projection 110 of FIGS. 8–10 can be made narrower and thinner than the projection 9 or 9A because it is not unduly weakened by the formation of a relatively deep recess so that it can more readily enter the aperture 102 or that it can enter a narrower aperture in a leader. This is particularly important when the diameter of the supply 99 of convoluted film or the like is relatively small. In FIG. 8, the film supply 99 is shown as being mounted on a support, such as a rotary spindle 100 of the motion picture projector.

When the tip of the leader enters the passage between the wheels 104, 107 and is engaged by the periphery of the rotating friction wheel 104 which rotates in the direction indicated by arrow 106, the friction wheel 104 cooperates with the core of the idler wheel 107 to advance the leader toward the takeup reel, not shown, whereby the leader 101 moves relative to and is separated from the projection 110 of the catcher 109.

As mentioned before, the relatively shallow notch 120 shown in FIG. 10 constitutes an optional feature of the guide means on the catcher 109; this notch can be provided in order to insure an even more satisfactory orientation of the leader 101 and to thus further insure that the tip of the leader will find its way into the passage defined by the advancing means.

An important advantage of the apparatus including the improved catcher 9A or 109 is that the apparatus need not be provided with any guide means adjacent to the path of movement of the catcher between the supply of convoluted film or the like and the advancing means. Therefore, the support can carry relatively large, medium-sized or relatively small supplies of convoluted strip-shaped web-shaped material. This will be understood by referring to FIG. 8 which shows that, save for the guide means on the catcher 109, the apparatus does not have any guide means in the space between the support 100 and the wheels 104, 107. As mentioned above, the length of strokes which the catcher 9A or 109 performs depends on the diameter of the supply of convoluted material on the support. The distance between the support 100 and the wheels 104, 107 of FIG. 8 can be readily selected in such a way that the support 100 can be used to carry supplies of any desired or practical diameter.

Another advantage of the improved apparatus is that the guide means which is employed to insure accurate guidance of the leader between the support and the advancing means is extremely simple, compact, light-weight and inexpensive. Such guide means not only straightens out a deformed leader but also centers the catcher when the latter approaches the idler wheel 7 or 107 so that the catcher is even more likely to introduce the tip of the leader between the periphery of the friction wheel 4 or 104 and the core of the idler wheel 7 or 107.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. Apparatus for intercepting and threading the apertured leader of strip-shaped material, such as motion picture film, comprising a support for a supply of convoluted strip-shaped material; advancing means spaced apart from said support and defining a passage for the leader of the supply of convoluted material on said support; a catcher movable along a predetermined path extending between the supply on said support and said passage, said catcher having a projection having an edge face facing said advancing means and arranged to enter the aperture of the leader of the supply on said support and guide means provided in the region of said projection and including a recess provided in said edge face to receive and retain a portion of the leader during movement of said projection away from the supply of convoluted material on said support so as to orient the leader whose aperture receives said projection so that the leader enters said passage on movement of said catcher along said path from the supply on said support toward said advancing means; and means for moving said catcher.

2. Apparatus for intercepting and threading the apertured leader of strip-shaped material, such as motion picture film, comprising a support for a supply of convoluted strip-shaped material; advancing means spaced apart from said support and defining a passage for the leader of the supply of convoluted material on said support; a catcher movable along a predetermined path extending between the supply on said support and said passage, said catcher having a projection arranged to enter the aperture of the leader of the supply on said support and guide means provided in the region of said projection and comprising a pair of guide surfaces flanking said projection and normally abutting against one side of the leader during movement of said projection away from the supply on said support, said guide means serving to orient the leader whose aperture receives said projection so that the leader enters said passage on movement of said catcher along said path from the supply on said support toward said advancing means; and means for moving said catcher.

3. Apparatus as defined in claim 2, wherein said catcher comprises two platforms flanking said projection and provided with said guide surfaces, said advancing means comprising a wheel having two axially spaced flanges and said platforms being arranged to move between said flanges in response to movement of said projection away from the supply on said support so that the leader whose aperture receives said projection is centered between said flanges on entry into said passage.

4. Apparatus as defined in claim 2, wherein said projection comprises an edge face facing said passage and said guide surfaces are located between said edge face and said advancing means.

5. Apparatus as defined in claim 2, wherein said projection comprises an edge face facing said passage and said located between said guide surfaces and said advancing means.

6. Apparatus as defined in claim 2, wherein said projection comprises an edge face facing said passage and each of said guide surfaces includes a first portion and a second portion, said first portions of said guide surfaces being located between said edge face and said advancing means and said edge face being located between said advancing means and said second portions of said guide surfaces.

7. Apparatus as defined in claim 6, wherein said first and second portions of each of said guide surfaces make an obtuse angle.

8. Apparatus as defined in claim 2, wherein said projection has an edge face facing said advancing means and a notch into which the leader extends while the aperture of the leader receives said projection.

9. Apparatus as defined in claim 2 for intercepting and threading the leader of strip-shaped material having a predetermined width, wherein the thickness of said catcher, as considered at right angles to the direction of movement of said catcher along said path, is a small fraction of said predetermined width.

* * * * *